Sept. 29, 1942.   E. L. SNYDER   2,297,030
ELECTRICALLY OPERATED TANK HEATER
Filed Dec. 16, 1940
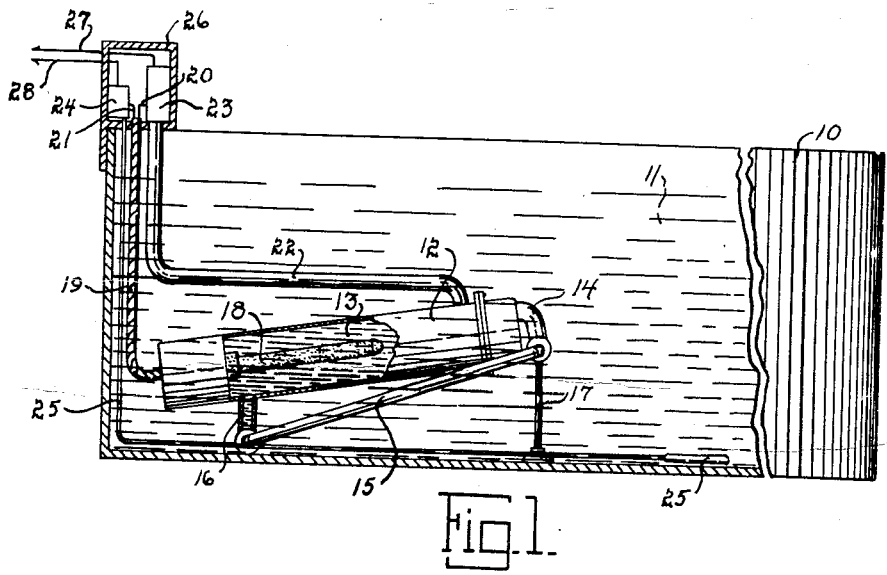
Fig. 1.
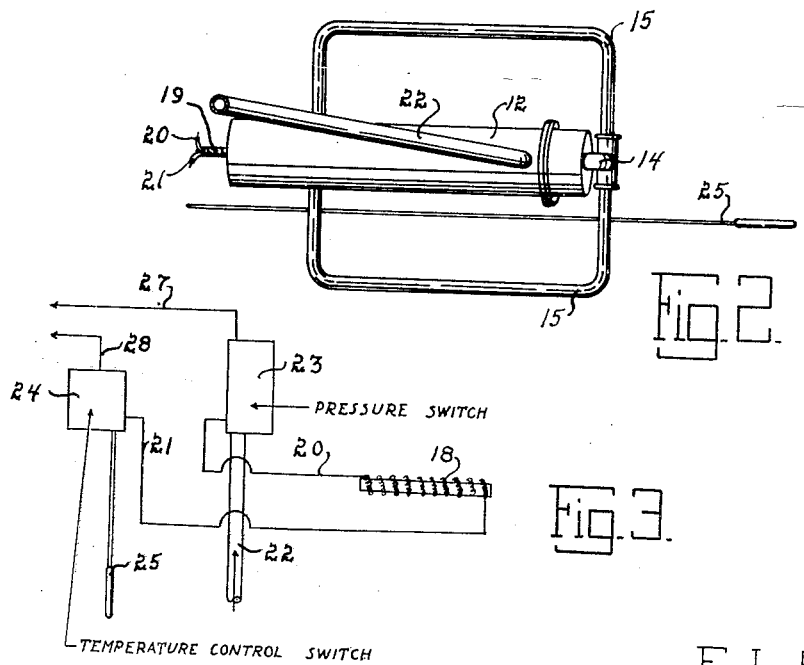
Fig. 2.
Fig. 3.
INVENTOR.
E. L. SNYDER
BY M. Talbert Dick Patented Sept. 29, 1942

2,297,030

UNITED STATES PATENT OFFICE 2,297,030

ELECTRICALLY OPERATED TANK HEATER

Elmer L. Snyder, Spencer, Iowa

Application December 16, 1940, Serial No. 370,275

8 Claims. (Cl. 219—38)

The principal object of this invention is to provide an electrically operated tank heater having a self-circulating fluid flow which will efficiently heat water tanks to prevent them from freezing in cold weather.

A further object of this invention is to provide an electrically operated tank heater that is both thermostatically and pressure controlled for maintaining a uniform temperature of water in a container.

A still further object of this invention is to provide an electrically operated tank heater that is economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a side partial sectional view of my complete heating unit installed in a watering tank and ready for use.

Fig. 2 is a top plan view of the heater unit and circulator.

Fig. 3 is a schematic diagram of the electrical portion of the device.

It has always been necessary to heat water in stock watering tanks during sub-freezing weather to prevent ice from forming in the tank and to maintain a constant water temperature above the freezing mark. This has heretofore been accomplished through the use of wood burning or oil burning heaters. Such heaters are merely make-shifts and do not perform the job efficiently due to the fact that they require constant attention, are sometimes extinguished by winds and eddy currents, and heat the water too much if they are not properly regulated according to atmospheric temperatures. I have overcome such disadvantages as will be appreciated and as will be hereinafter more fully set forth.

Referring to the drawing, I have used the numeral 10 to designate a stock watering tank of the usual type, and which for purposes of illustration I have shown filled with water 11. It is in combination with such a tank that I use my electrically operated heater which I will now describe. The numeral 12 indicates a barrel portion into which is introduced a suitable anti-freeze solution 13. This anti-freeze solution may be in the form of glycerine, an alcohol solution, or one of the ethylene glycol solutions. This barrel or container 12 is placed on an angle as shown in the drawing, and has in communication with its upper inside end a pipe 14, which is in turn in communication with a radiating pipe 15. The lower end of the container 12 is in communication with the radiator or radiator pipe 15. Thus the warm solution would enter the pipe 14, would radiate through the radiating means 15, and the colder solution would again enter the lower part of the chamber 12, thus causing a circulation of fluid through the radiating system on the thermosiphon principle. To support the radiating system within the tank 10 I have provided a leg member 17. The numeral 18 indicates an electrically operated heating unit of the immersion type placed within the chamber 12 and having emerging therefrom through the medium of the waterproof conduit 19, the two electric lead lines 20 and 21. The numeral 22 indicates a pipe or pressure tube having its lower end in communication with the chamber 12 adjacent its highest point and having its other end in communication with a pressure actuated electrical control switch 23. The numeral 24 indicates a temperature actuated switch which is in communication with one end of a capillary tube 25, which may be immersed in the tank 10 at a point a distance from the heater unit for controlling the temperature of the water 11 within the tank 10. The numeral 26 indicates a junction box which may be secured to the side top rim of the tank 10 for housing the thermostatic switch 24 and pressure switch 23. It will here be noted that the wire 20 enters one side of the pressure switch and the other side of the pressure switch is in communication with an electric lead line 27 leading to a source of electrical power. The electrical lead line 21 is in communication with one side of the thermostatic switch 24 and the other side of the thermostatic switch 24 is in communication with a source of electrical current through the medium of the wire 28. Thus the pressure switch 23, the thermostatic switch 24 and the heating element or immersion element 18 are wired in series to the electrical input. By this means, the circuit will be broken to the heating unit either when the pressure within the radiating member becomes too high, or when the temperature of the water within the tank has reached a predetermined reading.

It will also be noted that by leaving the upper end of the tube 12 open, and by extending the pipe 16 to the other side of the tank 10, the water 11 within the tank 10 may be circulated past the heating unit 18, thus directly heating the water instead of indirectly heating it through the solution 13 and the casing 12, and the radiating system 15.

In practical operation, the whole device may be installed as one unit and all that is necessary is to connect the wires 27 and 28 to a suitable source of electrical energy and the device is ready to operate. The capillary tube 25 may be placed at any desired location within the tank 10, and inasmuch as the thermostatic unit or control switch or temperature control switch 24 is set at a predetermined reading above freezing, the heater element will be actuated, heating the solution 13, which radiates through the tube 12 and the radiating pipes 15, thereby conducting the heat into the water 11. As soon as the desired temperature is reached, the temperature control switch will be opened, thus breaking the circuit, and should the pressure within the radiating system become high, the pressure switch 23 will be actuated, thereby breaking the circuit. Thus maximum safety is obtained as well as trouble-free operation.

Thus it will be seen that I have provided an electrically operated tank heater which fulfills all of my objects, that requires no attention, is automatic in its operation, is safe, and one which will efficiently heat tank water to any desired temperature without overheating the water and one which may be easily and quickly installed by anyone.

Some changes may be made in the construction and arrangement of my improved electrically operated tank heater without departing from the real spirit and purpose of my invention, and it is my intention to cover by my claims any modified forms of structure or use of mechanical equivalents which may be reasonably included within their scope.

I claim:

1. In a device of the class described, a tube member, a self-circulating radiating system in communication with said tube member; said radiating system and said tube designed to be immersed in a water tank, an electrically operated heating unit inside said tube member for heating said tube and said radiating system, a means for connecting said heating unit to a source of electrical energy, a thermostatic switch imposed in one of the electric lead lines between said heating element and said source of electrical energy, and a capillary tube having one end in operative communication with said thermostatic switch and its other end designed to be immersed in the water of a watering tank at a point distant from said tube and said radiating system.

2. In a device of the class described an elongated barrel adapted to be disposed at an angle to both the horizontal and the vertical, an electrical heating element within said barrel, flowable anti-freeze material within said barrel, exhaust port adjacent the high end of said barrel, an intake port in the wall structure of said barrel at a point below said exhaust port, a generally rectangular shaped radiator comprising hollow pipe and adapted to be disposed in the main below said barrel, means for connecting said radiator to the exhaust port of said barrel, means for connecting said radiator to the intake port of said barrel, a conduit connecting the interior of said barrel with a pressure switch in the electrical circuit of said electrical heating element, and temperature actuated control means adapted to be disposed along the bottom of a watering tank at a distance from said barrel connected to a switch in the electrical circuit of said electrical heating element.

3. In a device of the class described an elongated barrel adapted to be disposed in a plane inclined to the plane of the bottom of a watering tank, an electrical heating element within said barrel, an exhaust port in the upper half of said barrel, an intake port in the lower half of said barrel, a generally rectangular shaped radiator comprising hollow pipe and adapted to be disposed in the main below said barrel, means for connecting said radiator to said intake port, and means for connecting said radiator to said exhaust port.

4. In a tank heater, a barrel adapted to be disposed in an inclined position relative the bottom of a tank, a radiator comprising lengths of pipe connected together to confine a generally rectangular area adapted to be disposed at an incline to said tank bottom and to be situated to a substantial extent, at least, at a lower level than said barrel, means for connecting the interior of one of said lengths of pipe, intermediate its ends, with the interior of said barrel and means for connecting the interior of another of said lengths of pipe, intermediate its ends, with the interior of said barrel at a point lower in elevation than the point at which first said length of pipe communicates with said barrel.

5. In a tank heater, a barrel adapted to be disposed in an inclined position relative the bottom of a tank, a radiator comprising lengths of pipe connected together to confine a generally rectangular area adapted to be situated to a substantial extent, at least, at a lower level than said barrel, means for connecting the interior of one of said lengths of pipe, intermediate its ends, with the interior of said barrel and means for connecting the interior of another of said lengths of pipe, intermediate its ends, with the interior of said barrel at a point lower in elevation than the point at which first said length of pipe communicates with said barrel.

6. In a tank heater, a barrel adapted to be disposed in an inclined position relative the bottom of a tank, a radiator comprising lengths of pipe connected together to confine a generally rectangular area adapted to be disposed at an incline to said tank bottom and to be situated to a substantial extent, at least, at a lower level than said barrel and means of communication between said radiator and said barrel at a plurality of points.

7. In a tank heater, a barrel adapted to be disposed in an inclined position relative the bottom of said tank and in spaced relationship to said bottom, an electrical heating element within said barrel, and a temperature actuated means for controlling the flow of current in said electrical heating element, said control means being disposed adjacent the bottom of the tank and in substantial spaced relationship to said barrel.

8. In a device of the class described an elongated barrel adapted to be disposed at an angle to both the horizontal and the vertical, an electrical heating element within said barrel, flowable anti-freeze material within said barrel, exhaust port adjacent the high end of said barrel, an intake port in the wall structure of said barrel at a point below said exhaust port, a generally rectangular shaped radiator comprising hollow pipe and adapted to be disposed in the main below said barrel, means for connecting said radiator to the exhaust port of said barrel, means for connecting said radiator to the intake port of said barrel, and temperature actuated control means adapted to be disposed along the bottom of a watering tank at a distance from said barrel connected to a switch in the electrical circuit of said electrical heating element.

ELMER L. SNYDER.